(12) United States Patent
Huang

(10) Patent No.: US 7,377,604 B2
(45) Date of Patent: May 27, 2008

(54) PRINTER AND METHOD FOR PRINTING THEREOF

(75) Inventor: Chien-Chih Huang, Tai-Chung Hsien (TW)

(73) Assignee: Qisda Corporation, Shan-Ting Tsun, Gueishan Hsiang, Taoyuan County (TW)

( * ) Notice: Subject to any disclaimer, the term of this patent is extended or adjusted under 35 U.S.C. 154(b) by 382 days.

(21) Appl. No.: 10/905,872

(22) Filed: Jan. 25, 2005

(65) Prior Publication Data

US 2005/0174373 A1   Aug. 11, 2005

(30) Foreign Application Priority Data

Feb. 9, 2004   (TW) .............................. 93102972 A

(51) Int. Cl.
*B41J 29/38* (2006.01)
(52) U.S. Cl. ................................. 347/5; 347/9; 347/14
(58) Field of Classification Search ..................... 347/5, 347/9, 14, 19; 358/502
See application file for complete search history.

(56) References Cited

U.S. PATENT DOCUMENTS 5,440,410 A * 8/1995 Sugishima .................. 358/502
6,219,153 B1 * 4/2001 Kawanabe et al. ........ 358/1.16

* cited by examiner

*Primary Examiner*—Lam S Nguyen
(74) *Attorney, Agent, or Firm*—Winston Hsu

(57) ABSTRACT

A printer includes a print generator for generating a print signal at a predetermined constant rate according to a predetermined resolution, a data transducer for downloading raw data, a printhead for printing the raw data downloaded by the data transducer, an encoder for recording the relative position of the printhead, and a controller for receiving the print signal and for controlling the printhead to print the data corresponding to the print signal. When receiving a current print signal and the printhead has not completed printing the data corresponding to a previous print signal, the controller controls the printhead to print the data corresponding to the print signal after the data corresponding to the previous print signal is printed, and does not wait for the next print signal.

7 Claims, 9 Drawing Sheets

PRINTER AND METHOD FOR PRINTING THEREOF

BACKGROUND OF INVENTION

1. Field of the Invention

The present invention relates to a printer, and more specifically, to a printer which is capable of controlling a data printing period.

2. Description of the Prior Art

With the rapid development of printing equipment, printers have become necessary peripheral devices. Inkjet printers, due to their cheap prices and excellent print quality, have become one of the most popular printing apparatuses.

Please refer to FIG. 1 and FIG. 2. FIG. 1 is a block diagram of an inkjet printer 10 according to the prior art. FIG. 2 shows a waveform of a phase signal produced by a phase encoder 11 shown in FIG. 1. The inkjet printer 10 comprises the phase encoder 11, a print signal generator 12, a data transducer 14, a head driver 16 and a printhead 18. The phase encoder 11 produces phase signals A and B for recording the position of the printhead 18 as the printhead 18 moves. The print signal generator 12 produces a print signal as the printhead 18 moves at a constant speed to a predetermined position. As can be seen in FIG. 2, the print signal generator 12 will generate a print signal whenever the printhead 18 moves to the position N, N+1, N+2, etc. (as the phase signal A or B changes), where the distance between N, N+1, N+2, etc. is fixed. After receiving a printing signal, the data transducer 14 will download the raw data, and ultimately, the head driver 16 will drive the printhead 18 to print the downloaded data.

Please refer to FIG. 3. FIG. 3 is a stable signal diagram, where the horizontal axis represents time, showing that the printed resolution at which the printer 10 prints is higher than the normal mode. Supposing that the normal mode of the printer 10 is 600 dpi (dots per inch), if the printer 10 works under the resolution of 600 dpi, the print signal generator 12 produces a print signal P1 as the printer 18 reaches the position N, produces a print signal P5 as the printer 18 reaches the position N+1, produces a print signal P9 as the printer 18 reaches the position N+2, and so on. If the printer 10 is operated in high resolution mode, the print signal generator 12 will determine a predetermined inkjet distance based on the selected high resolution and generate a print signal at the predetermined inkjet distance. For instance, when the printer 10 for which the normal mode is 600 dpi works at the high resolution of 2400 dpi, the printer 10 controls the printhead 18 to eject three ink drops between an interval of every two drops originally printed in normal mode by using interpolation. In other words, the print signal generator 12 will divide the time in which the printhead 18 previously took to move from the position N−1 to the position N into three equal ejecting times based on the desired resolution, and produces a print signal P2, P3, P4 at a constant rate. After receiving the print signal, the data transducer 14 will download the corresponding data in turns, and the head driver 16 will drive the printhead 18 to print the downloaded data. In this way, the printed resolution increases as the ejecting time in the unit length increases.

In order to eject additional ink drops with adequate time, however, the printhead 18 needs to slow down in the process of printing at the high resolution.

Please refer to FIG. 4 in conjunction with FIG. 3. FIG. 4 is an actual signal diagram showing that the printed resolution at which the printer 10 prints is higher than the normal mode. Even though the print signal generator 12 is capable of generating a print signal at each predetermined time according to the predetermined resolution, as previously mentioned, the printhead 18 must slow down in the process of printing at the high resolution. Nevertheless, the moves of the printhead 18 will be unstable at low speed due to mechanism used to move the printhead. As a result, even though the time which the print signal generator 12 generates a print signal is fixed, due to the unstable moving speed of the printhead 18, ejecting ink drops may possibly fall on the incorrect predetermined positions. As shown in FIG. 4, when Data8 has not yet been completely printed by the printhead 18, and the next print signal P9 is received by the transducer 14 and the raw data Data9 is downloaded, at this moment, the printhead 18 is printing the previous data Data8 with unstable velocity. Consequently, the print data generator 12 will ignore the print signal P9, and not inform the data transducer 14 to download the corresponding data Data9. When an upcoming print signal P10 is generated, the data transducer 14 will download the raw data Data9 instead, and the data transducer 14 will download the raw data Data10 as the print signal P11 is generated. Despite the total printed distance for each swath being predetermined, as well as the required times of the print signal for each swath, it is possible that after all required print signals for each swath are generated, some of the data still has not been downloaded and printed, causing a print error. As a result, downloading and printing the data corresponding to the print signals successfully is a problem desired to be solved.

SUMMARY OF INVENTION

It is therefore a primary objective of the claimed invention to provide a printer that is capable of controlling print signals and capable of controlling the number of times for printing data corresponding to the print signals in order to solve the above-mentioned problem.

According to the claimed invention, a printer comprises a print generator for generating a print signal at a predetermined constant rate according to a predetermined resolution, a data transducer for downloading raw data, a printhead for printing the raw data downloaded by the data transducer, an encoder for recording the relative position of the printhead, and a controller for receiving the print signal and for controlling the printhead to print the data corresponding to the print signal. When receiving a current print signal and the printhead has not completed printing the data corresponding to a previous print signal, the controller controls the printhead to print the data corresponding to the current print signal after the data corresponding to the previous print signal is printed, and does not wait for the next print signal.

DETAILED DESCRIPTION

Figure 1:
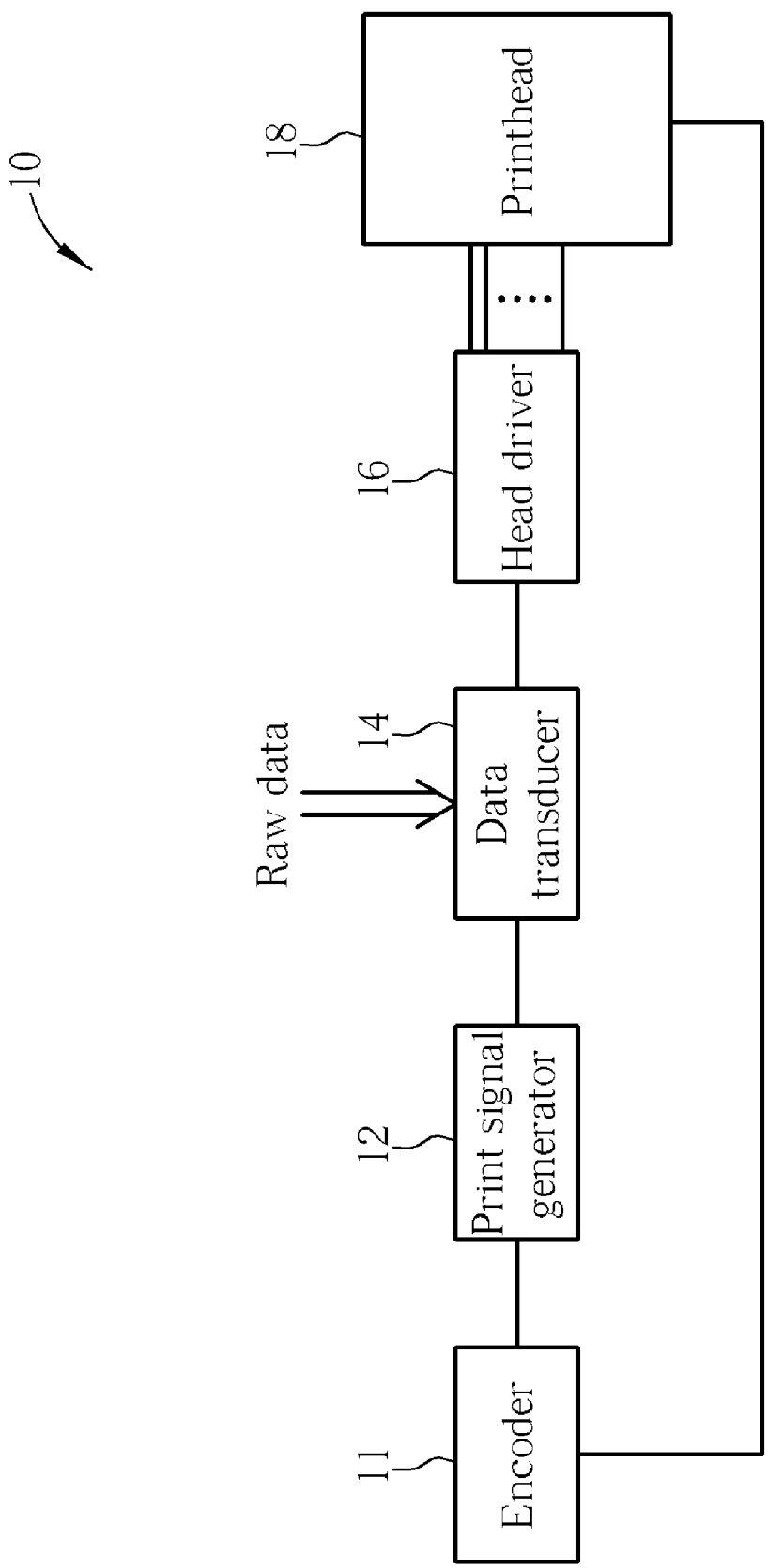
FIG. 1 is a block diagram of an inkjet printer according to the prior art.
Figure 2:
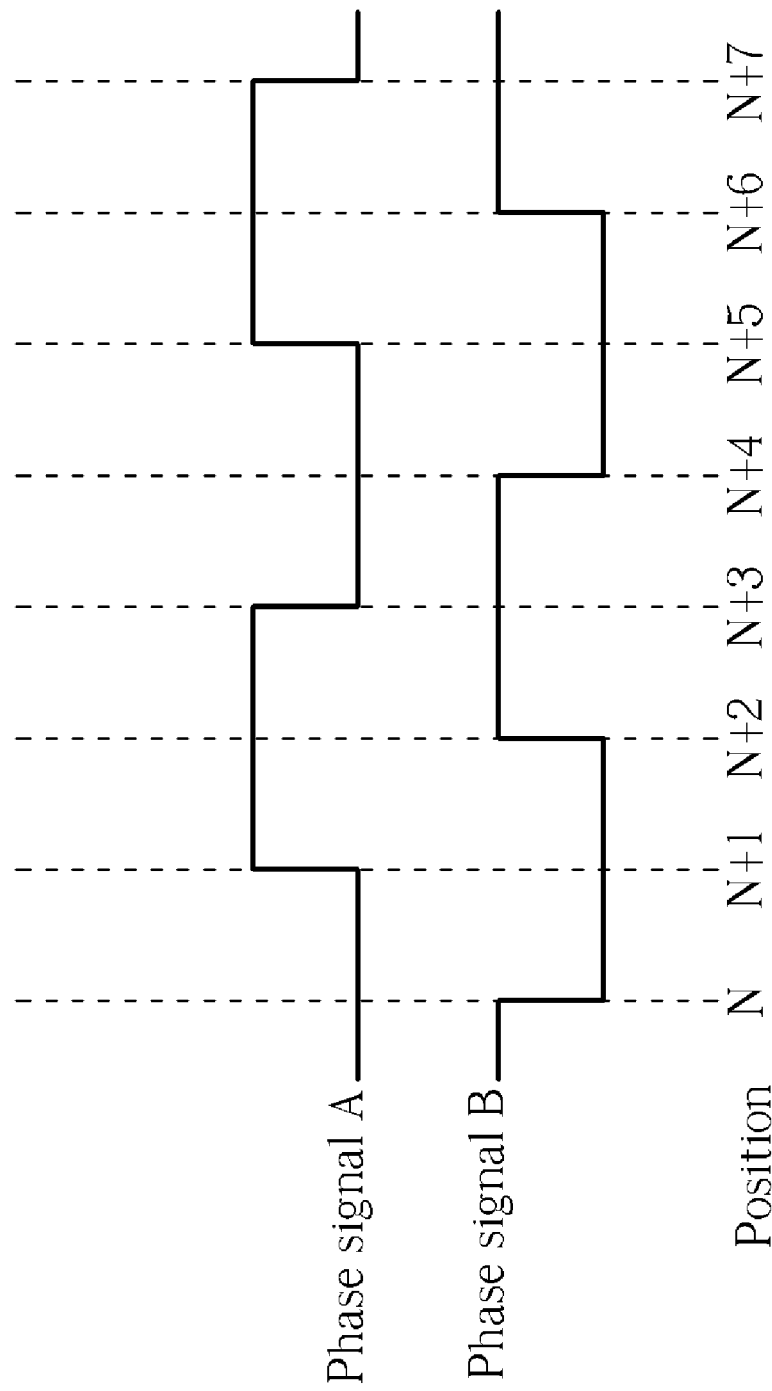
FIG. 2 shows a waveform of a phase signal produced by a phase encoder shown in FIG. 1.
Figure 3:
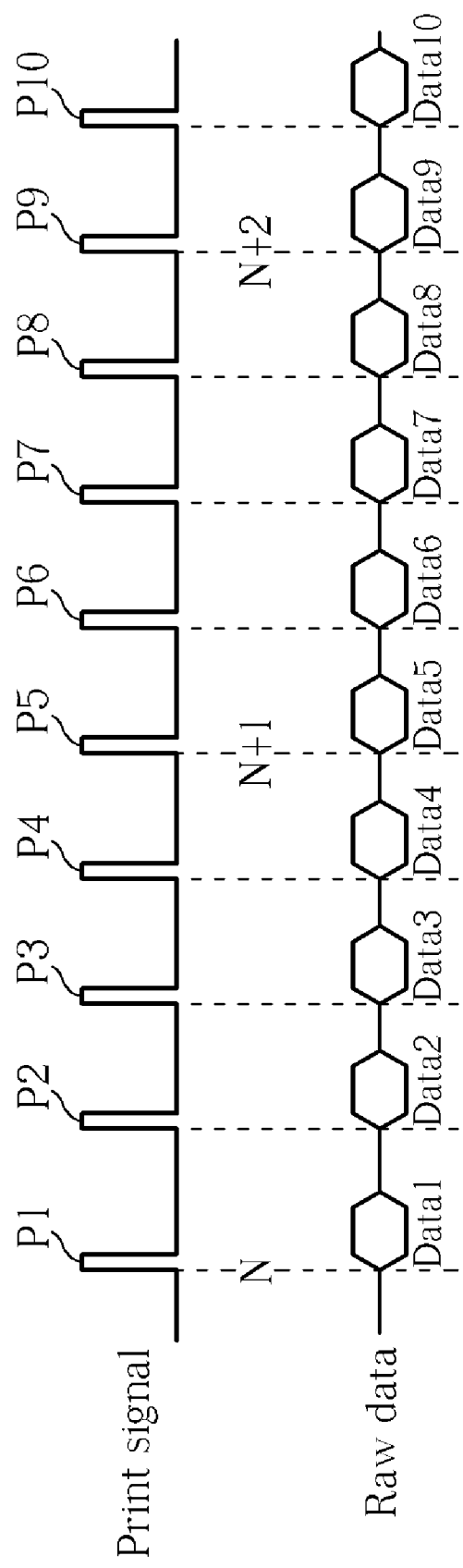
FIG. 3 is a stable signal diagram showing that the printed resolution at which the printer prints is higher than the normal mode.
Figure 4:
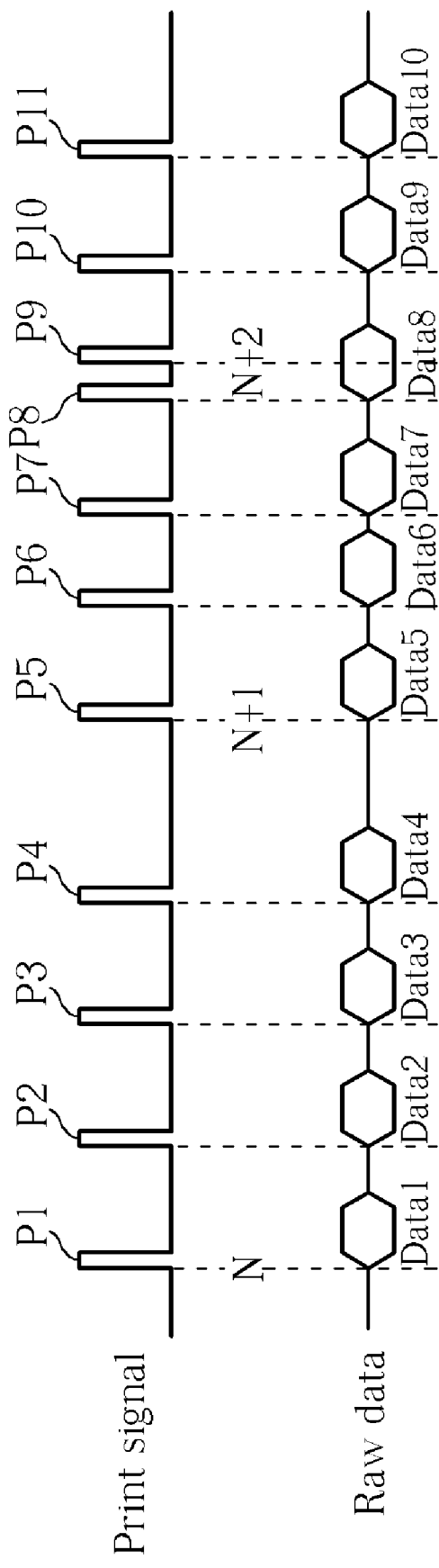
FIG. 4 is an actual signal diagram showing that the printed resolution at which the printer prints is higher than the normal mode.
Figure 5:
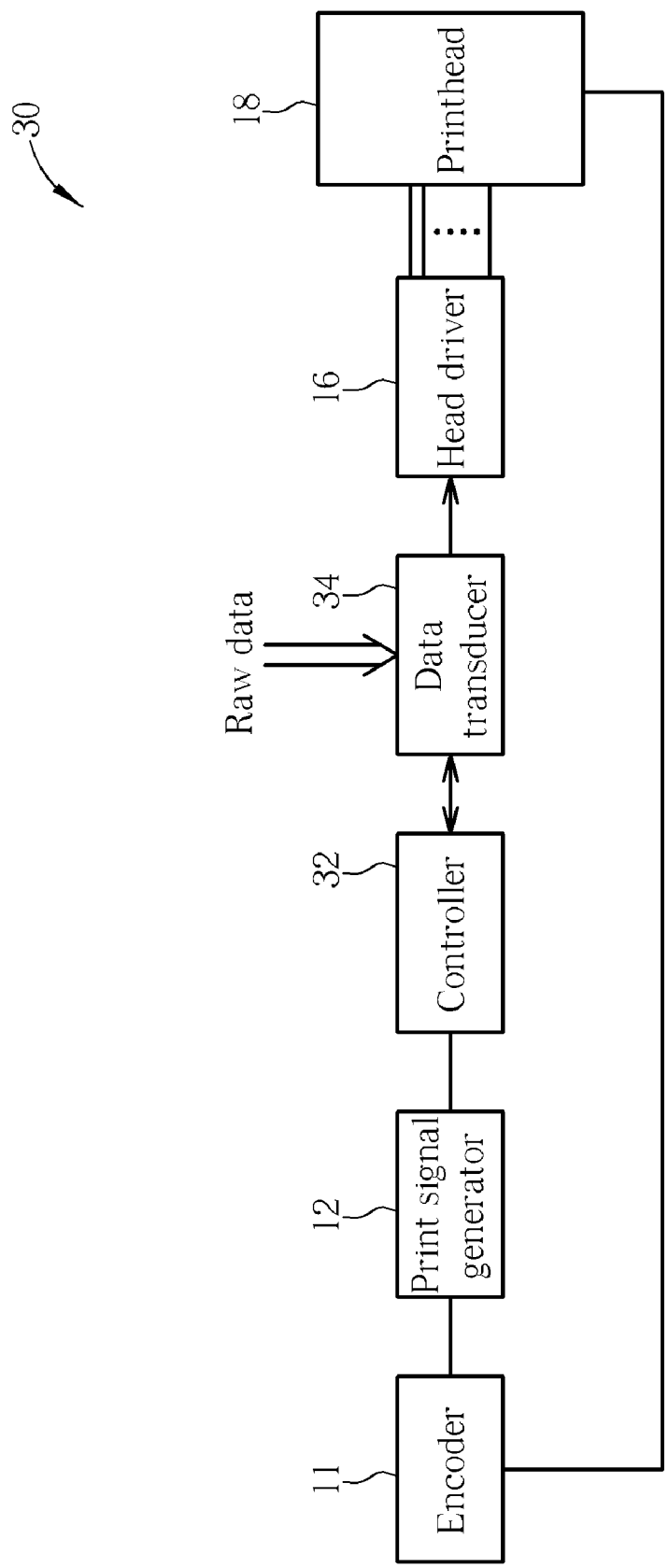
FIG. 5 is a functional block diagram of a printer according to the present invention.

Please refer to FIG. 5. FIG. 5 is a functional block diagram of a printer 30 according to the present invention. The printer 30 comprises an encoder 11, a print signal generator 12, a data transducer 34, a printhead driver 16, a printhead 18 and a controller 32. For simplicity, elements in FIG. 5 that have the same function as that illustrated in FIG. 1 are provided with the same item numbers as those used in FIG. 1. The print signal generator 12 is used to generate a monostable print signal at a predetermined constant speed according to a predetermined resolution. After receiving the print signal, the controller 32 will generate a corresponding control signal. And after receiving the control signal, the data transducer 34 will download the raw data. Eventually, the printhead driver 16 will drive the printhead 18 to print the downloaded raw data, and the encoder 11 will record moving traces of the printhead 18.

Figure 6:
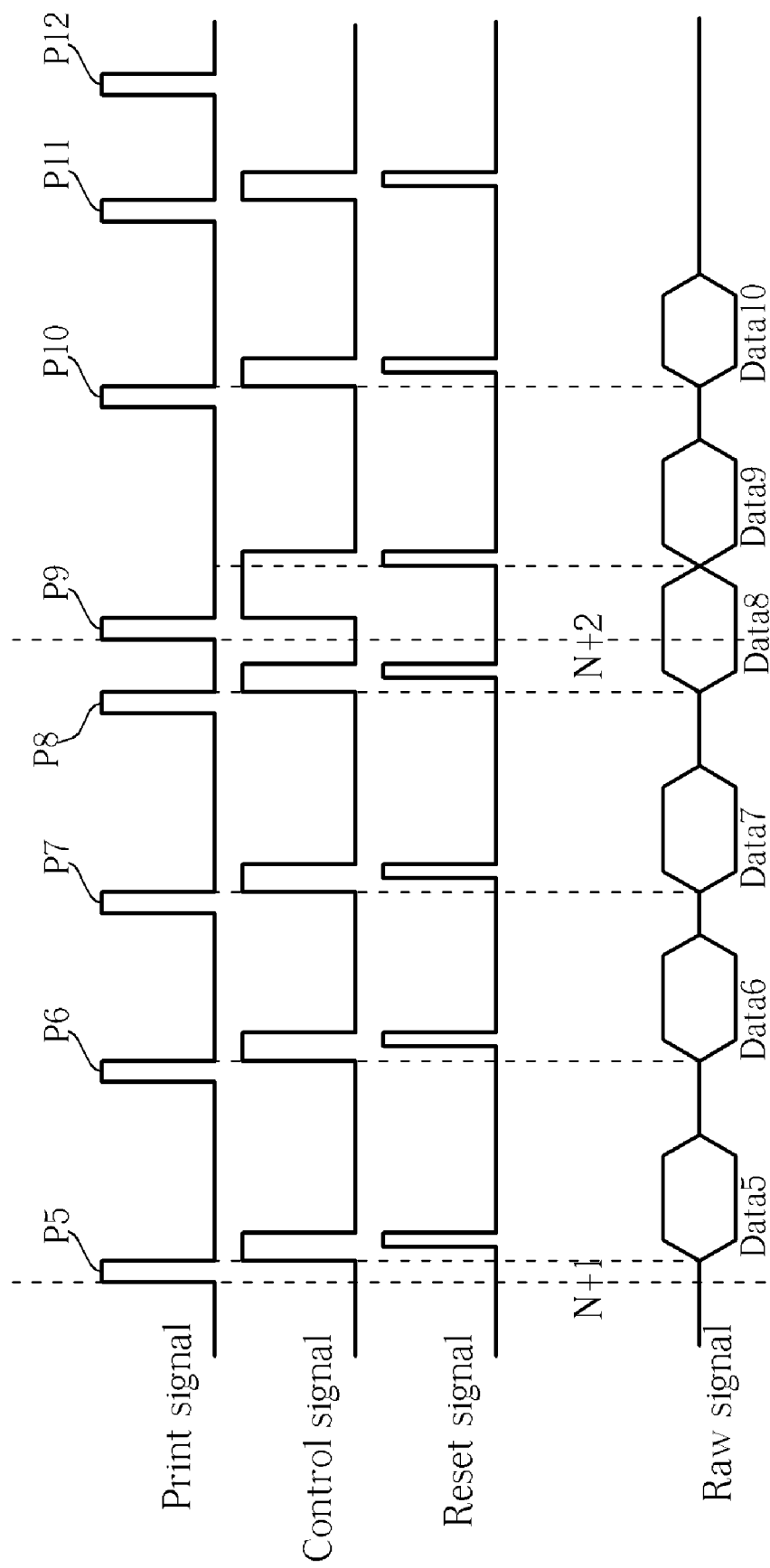
FIG. 6 is a diagram of generation time of each associated signal with respect to position for each swath as the printer prints at high resolution.

Please refer to FIG. 5 and FIG. 6. FIG. 6 is a diagram of generation time of each associated signal with respect to position for each swath as the printer 30 prints at high resolution. Suppose that the standard normal mode of the printer 30 of the present invention is 600 dpi. If a high resolution of 2400 dpi is desired, the print signal generator 12 will produce print signals P6, P7, P8 after ever period equaling one-third of the time in which the printhead 18 moves from the position N to the position N+1. Because the printhead 18 will move in an unstable speed, ejecting ink drops (i.e. the generation time of associated signal) may possibly fall on the incorrect predetermined positions as shown in FIG. 6. The print signal generator 12 will generate print signal P9 and then produce the print signal P10, P11, P12 after a period equaling every one-third of the print time in which the printhead 18 moves from the position N+1 to the position N+2.

Figure 7:
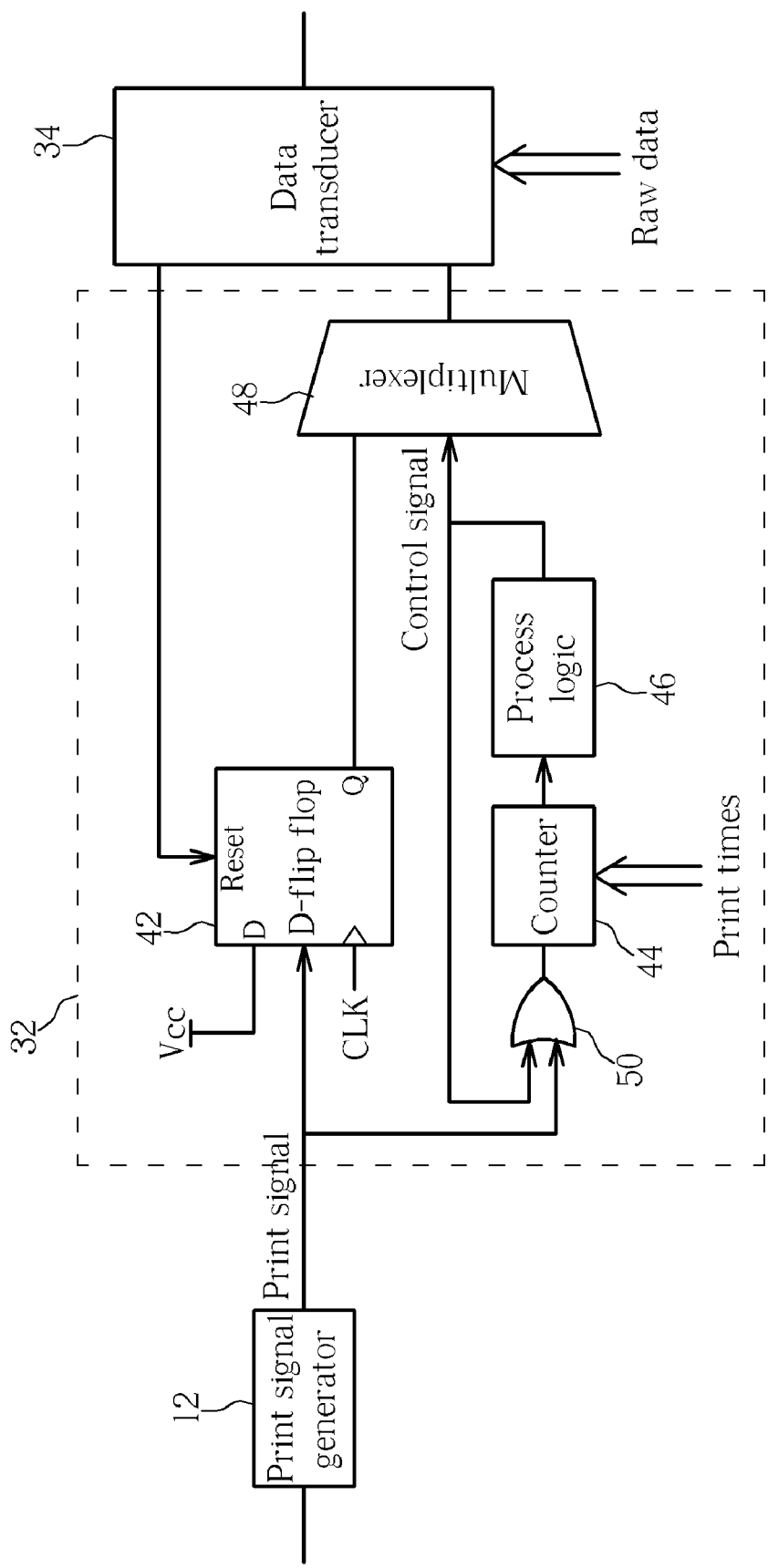
FIG. 7 is a detailed functional block diagram of the controller depicted in FIG. 5.

Please refer to FIG. 6 and FIG. 7. FIG. 7 is a detailed functional block diagram of the controller 32 depicted in FIG. 5. The controller 32 comprises a control signal generator 42, a counter 44, process logic 46, a multiplexer 48 and an OR gate 50. The control signal generator 42 can be a D-flip flop. After the control signal generator 42 receives the print signal P5, the control signal generator 42 will output a control signal, and the data transducer 34 will begin to download the corresponding raw data Data5 after receiving the control signal through the multiplexer 48. If the printhead 18 does not execute the printing at this moment, the head driver 16 will drive the printhead 18 to print the raw data Data5, and the data transducer 34 will deliver a reset signal to a reset end of the control signal generator 42. As shown in FIG. 6, the control signal generator 42 will reset the control signal after receiving the reset signal. The above-mentioned procedure is repeated as the next print signal P6 is generated. Provided that the control signal generator 42 receives the print signal P8 and generates a control signal, the data transducer 34 will download the raw data Data8 and make the printhead 18 print data after receiving the control signal. If the control signal generator 42 receives the print signal P9 and generates a corresponding control signal while the printhead 18 is printing the data Data8, the data transducer 34 will examine if the printhead 18 is being printed before receiving the control signal corresponding to the print signal P9. The printhead 18 is still in the condition of printing whilst the data transducer 34 is receiving the control signal. As a result, the data transducer 34 will not download the raw data Data9 corresponding to the print signal P9 and will not send a reset signal to a reset end of the control signal generator 42 until the printhead 18 completes printing the raw data Data8. After receiving the reset signal, the control signal generator 42 will reset a control signal. The data transducer 34 will deliver the raw data Data9 that was just downloaded to the printhead driver 16 as well drive the printhead 18 to download the raw data Data9. The above mentioned steps are repeated later when a next print signal P10 is generated.

Note that the data transducer 34 will drive the printhead 18 to print the downloaded data immediately or for an interval after downloading data.

Before a printer 30 executes a swath of printing, because the normal print distance of each swath is consistent, the number of ejecting times of each swath can be determined based on a predetermined resolution by the printhead 18 in advance. In the condition that the mode of the printer is 600 dpi, the printhead 18 needs to print n times in each swath. That is, the print signal generator 12 needs to generate print signals for n times. If the mode of the printer 30 is changed to 2400 dpi, the printhead 18 needs to print 4*n times in each swath, that is, the print signal generator 12 needs to generate print signals for 4*n times. Please refer to FIG. 6 and FIG. 7 again. When the resolution is determined, the total number of ejecting times will be stored in a counter 44. Suppose that the number of ejecting times in each swath is H in this embodiment. The counter 44 will add up the number N of received print signals by receiving print signals through an OR gate 50. Once the printhead 18 moves to the end of a swath, when the printhead 18 supposed to finish up the printing in the swath, at this moment, the counter 44 will compare the added-up number N with the predetermined print number H. If the added-up number N is consistent with the predetermined print number H, it means the task of printing all data in the swath has been completed successfully. If the added-up number N does not match with the predetermined print number H, it means all data supposed to print have not been downloaded and printed yet, and the counter 44 will generate a clean signal to process logic 46 at this time. For instance, suppose that there are ten raw data not to be downloaded and processed by the data transducer 34 after the printing work is finished. At this moment, the process logic 46 will send control signals for an interval after receiving the clean signal. And the data transducer 34 will download the ten data, but the printhead 18 will not print the ten data when the data transducer 34 receives the control signal from the process logic 46. Meanwhile, the counter 44 will add up the number of the control signals sent from the OR gate 50 with the previous print signal number N until the added-up print signal number N matches with the predetermined print number H. If the added-up print signal number N matches with the predetermined print number H, the clean signal will be eliminated, so that the process logic 46 will not output control signals.

In conclusion, the counter 44 will count a number of the print signals and compare the number of the print signals with the required number of print times in each swath after the printhead 18 arrives the end of each swath for determining if the raw data of each swath have all been downloaded and printed by the printhead 18. If there are still some data not to be printed, the counter 44 will inform the process logic 46 to generate a control signal so as to notify the data transducer 34 to download the rest of raw data. But such data will not to be printed so as to avoid print errors.

Figure 8:
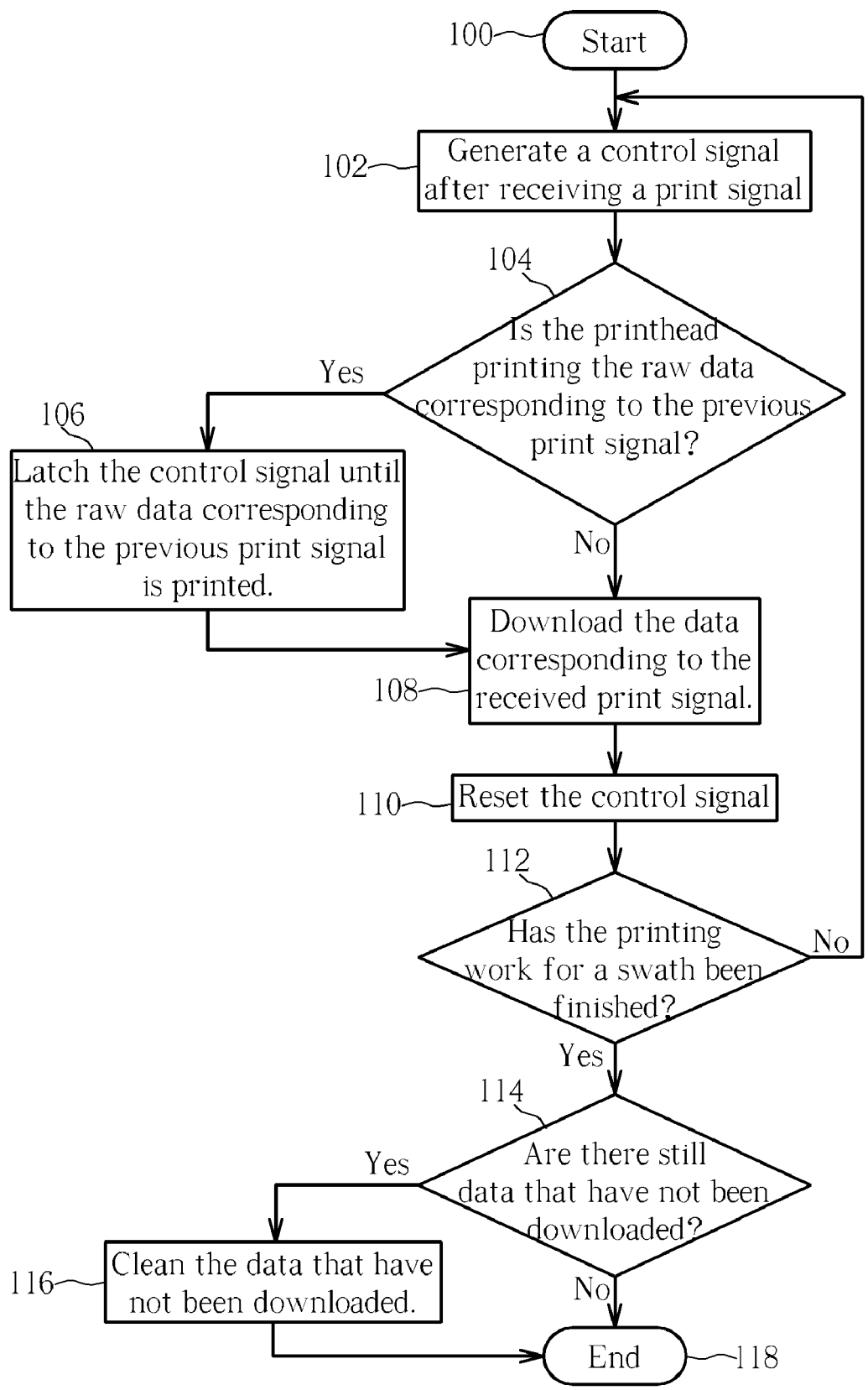
FIG. 8 is a flow chart of the present invention method.

In order to demonstrate the process of the method of the present invention briefly, please refer to FIG. 8. FIG. 8 is a flow chart of the present invention method.

Step 100: Start.

Step 102: The control signal generator 42 of the controller 32 generates a control signal after receiving the print signal generated by the print signal generator.

Step 104: Determine if the printhead 18 is printing the raw data corresponding to the preceding print signal, if it is, go to step 106; if not, go to step 108.

Step 106: Latch the control signal until the raw data corresponding to the preceding print signal is finished being printed.

Step 108: The data transducer 34 downloads the corresponding print data while receiving the print signal (in fact, what the data transducer 34 has received is the control signal corresponding to the received print signal.)

Step 110: Inform the control signal generator 42 to reset the control signal.

Step 112: Determine if the printing in each swath has been done, in other words, determine if the printhead 18 has arrived at the predetermined print end of each swath, if it has, go to step 114. If not, go back to step 102.

Step 114: Determine if there are still data that have not been downloaded, if there are, go to step 116; if not, go to step 118.

Step 116: Clean up the data that have not been downloaded.

Step 118: End.

Figure 9:
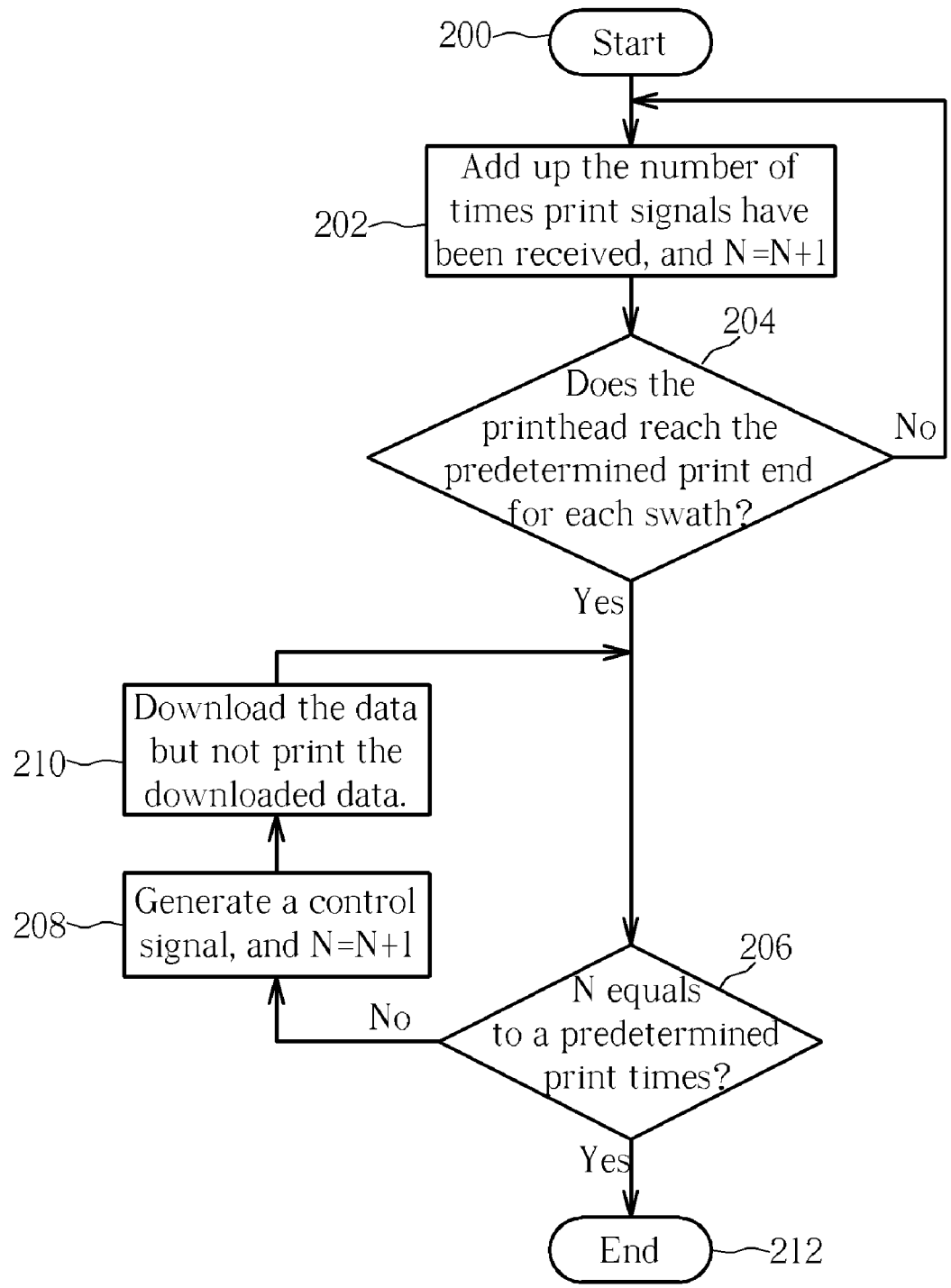
FIG. 9 is a detailed flow chart of determining if raw data have not been downloaded and providing a way to clean the raw data that have not been downloaded.

To determine if there are still some raw data that have not been downloaded in step 114 in FIG. 8 and to provide a way to clean the raw data have not been downloaded, the present invention provides the following steps as further procedures. Please refer to FIG. 9. FIG. 9 is a detailed flow chart of determining if there are still some raw data have not been downloaded and providing a way to clean the raw data that have not been downloaded.

Step 200: Start.

Step 202: Accumulate the number N of received print signals, where N represents the number of times print signals have been received.

Step 204: Determine if the printhead 18 has reached the predetermined print end for each swath, if it has, go to step 206, if not, go to step 202.

Step 206: Determine if the accumulated time N conforms to the number of predetermined print times for each swath, if it does, go to step 212, if not, go to step 208.

Step 208: Generate control signals and accumulate the control signals.

Step 210: The data transducer 34 will download the raw data, but will not drive the printhead 18 to print the downloaded data while receiving the control signals.

Step 212: End.

It should be noted that the execution of step 204 in FIG. 9 is equal to the execution of step 112 in FIG. 8. In other words, when the printhead 18 reaches the predetermined print end of each swath, the printhead 18 has completed a swath of printing as well. Moreover, the execution of step 204 in FIG. 9 is equal to the execution of step 112 in FIG. 8. In other words, when the added-up print signal time N does not match with the predetermined print time in each swath, this indicates that there are still data that have not been downloaded need to be cleaned. As a result, step 210 in FIG. 9 is performed to download the rest of the raw data, but not to print them. In another aspect, cleaning the raw data not downloaded in step 210 is equal to the execution of step 116 in FIG. 8.

Compared with the prior art, the present invention printer is capable of controlling the printhead to print the data corresponding to a print signal after the data corresponding to the previous print signal is printed and not waiting for the next print signal when receiving the print signal and the printhead has not completed printing the data corresponding to a previous print signal. Besides that, the controller will also determine whether the number of print signals matches the number of predetermined print times for each swath or not, to ensure that all the raw data for each swath are downloaded. If part of data is not downloaded, such data will be downloaded, but not printed, so as to prevent from printing errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A printer comprising:
   a print generator for generating a print signal at a predetermined constant rate according to a predetermined resolution;
   a data transducer for downloading raw data;
   a printhead for printing the raw data downloaded by the data transducer;
   an encoder for recording the relative position of the printhead; and
   a controller for receiving the print signal and for controlling the printhead to print the data corresponding to the print signal, wherein the controller comprises a control signal generator, coupled to the print signal generator, for generating a control signal when receiving the print signal generated by the print signal generator, the control signal generator comprising a reset end coupled to the data transducer for resetting the control signal when the data transducer has completed downloading raw data and for outputting a reset signal, and wherein the controller comprises a counter, the controller being capable of cleaning up the raw data which is not downloaded by the data transducer while the printhead completes printing each swath if the number of the control signals recorded by the counter is less than the predetermined print number corresponding to the predetermined resolution;
   wherein when receiving a current print signal and the printhead has not completed printing the data corresponding to a previous print signal, the controller controls the printhead to print the data corresponding to the current print signal after the data corresponding to the previous print signal is printed without waiting for the next print signal.

2. The printer of the claim 1, wherein the controller is capable of controlling the printhead to print the current data immediately after the data corresponding to the previous print signal is printed when the controller receives print data and the printhead has not finished printing the data corresponding to the previous print signal.

3. The printer of the claim 1, wherein the controller comprises process logic and a counter, the counter generating a clean signal to the process logic when the encoder records that the printhead completes print of a swath, and the number of control signals recorded by the counter is less than the predetermined print number corresponding to the predetermined resolution.

4. The printer of the claim 3, wherein the process logic generates control signals until the number of the control signals recorded by the counter is equal to the predetermined print number corresponding to the predetermined resolution, and the controller cleans the raw data not to be downloaded by the data transducer.

5. The printer of the claim 1, wherein the control signal generator is a D-flip flop.

6. A method of printing data for use in a printer, the printer comprising a print signal generator and a printhead, the method comprising following steps:
  (a) generating a print signal for a predetermined distance according to a predetermined resolution using the print signal generator;
  (b) when receiving a current print signal and the printhead does not complete printing the data corresponding to a previous print signal, controlling the printhead to print the data corresponding to the current print signal after the data corresponding to the previous print signal is printed without waiting for the next print signal, generating a control signal in response to receiving the current print signal, and resetting the control signal after downloading data and outputting a reset signal; and
  (c) cleaning up the raw data not to be downloaded when the printhead completes printing and the number of control signals is less than the predetermined print number corresponding to the predetermined resolution.

7. The method of claim 6, wherein step (b) comprises when receiving a current print signal and the printhead does not complete printing the data corresponding to a previous print signal, controlling the printhead to print the data corresponding to the current print signal immediately after the data corresponding to the previous print signal is printed.

* * * * *